United States Patent
Hicks et al.

(10) Patent No.: US 9,766,723 B2
(45) Date of Patent: Sep. 19, 2017

(54) STYLUS SENSITIVE DEVICE WITH HOVER OVER STYLUS CONTROL FUNCTIONALITY

(71) Applicant: Barnes & Noble College Booksellers, LLC, Basking Ridge, NJ (US)

(72) Inventors: Kourtny M. Hicks, Sunnyvale, CA (US); Gerald B. Cueto, San Jose, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 76 days.

(21) Appl. No.: 13/793,297

(22) Filed: Mar. 11, 2013

(65) Prior Publication Data

US 2014/0253465 A1    Sep. 11, 2014

(51) Int. Cl.
  *G06F 3/046* (2006.01)
  *G06F 3/0354* (2013.01)
  (Continued)

(52) U.S. Cl.
  CPC .......... *G06F 3/03545* (2013.01); *G06F 3/046* (2013.01); *G06F 3/0416* (2013.01); *G06F 3/0488* (2013.01); *G06F 2203/04101* (2013.01)

(58) Field of Classification Search
  CPC .... G06F 3/03545; G06F 3/0488; G06F 3/046; G06F 3/0416; G06F 2203/04101
  (Continued)

(56) References Cited

U.S. PATENT DOCUMENTS

| | | | |
|---|---|---|---|
| 4,896,543 A | 1/1990 | Gullman | |
| 5,045,843 A | 9/1991 | Hansen | |
| 5,576,502 A | 11/1996 | Fukushima et al. | |
| 5,577,299 A | 11/1996 | Thompson et al. | |
| 5,633,471 A | 5/1997 | Fukushima | |
| 5,844,557 A | 12/1998 | Shively, II | |
| 6,005,555 A * | 12/1999 | Katsurahira | ............ G06F 3/046 178/18.06 |

(Continued)

FOREIGN PATENT DOCUMENTS

EP     0722150 A1     7/1996

OTHER PUBLICATIONS

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html,  5 pages, printed from the Internet on Aug. 2, 2013.

(Continued)

*Primary Examiner* — Vinh Lam
(74) *Attorney, Agent, or Firm* — Finch & Maloney PLLC

(57) ABSTRACT

Techniques are disclosed for performing stylus-based actions in electronic devices without the stylus having to touch the stylus detection surface. A stylus action may include manipulating one or more control features of the stylus, and each control feature action or combination of actions may be associated with distinct functions. The device may detect, for example, whether the stylus is pointing to specific content or one or more UI control features or icons on the device, for which a corresponding function can be performed. In other cases, functions can be performed without reference to specific content. The device may track stylus location over the detection surface and the non-touch stylus action may be location sensitive. The various functions assigned to non-touch stylus actions may be performed on an application specific level, or a global device level. An animation can be displayed as non-touch stylus actions are executed.

21 Claims, 8 Drawing Sheets

(51) Int. Cl.
*G06F 3/0488* (2013.01)
*G06F 3/041* (2006.01)

(58) Field of Classification Search
USPC .................... 345/173–184; 178/18.01–20.04
See application file for complete search history.

(56) References Cited

U.S. PATENT DOCUMENTS

| | | | |
|---|---|---|---|
| 6,259,438 B1 | 7/2001 | Fleck et al. | |
| 6,271,830 B1 | 8/2001 | Berstis | |
| 6,498,601 B1 | 12/2002 | Gujar et al. | |
| 6,956,564 B1 | 10/2005 | Williams | |
| 7,292,229 B2* | 11/2007 | Morag | G06F 3/03545 178/18.07 |
| 7,646,379 B1* | 1/2010 | Drennan | G06F 3/03545 178/18.01 |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 9,411,461 B2* | 8/2016 | Marshall | G06F 3/0488 |
| 9,483,138 B2* | 11/2016 | Harris | G06F 3/04883 |
| 9,589,538 B2* | 3/2017 | Davidson | G09G 5/32 |
| 2001/0025289 A1 | 9/2001 | Jenkins et al. | |
| 2002/0047834 A1 | 4/2002 | Okamoto | |
| 2002/0116421 A1 | 8/2002 | Fox et al. | |
| 2002/0134594 A1 | 9/2002 | Taylor et al. | |
| 2002/0190823 A1 | 12/2002 | Yap | |
| 2003/0095115 A1 | 5/2003 | Brian et al. | |
| 2004/0095333 A1* | 5/2004 | Morag | G06F 3/03545 345/173 |
| 2004/0252110 A1 | 12/2004 | Defuans et al. | |
| 2005/0110777 A1 | 5/2005 | Geaghan et al. | |
| 2005/0156914 A1* | 7/2005 | Lipman | G06F 1/1626 345/179 |
| 2005/0200293 A1 | 9/2005 | Naugler et al. | |
| 2006/0267966 A1* | 11/2006 | Grossman | G06F 3/0346 345/179 |
| 2006/0284854 A1 | 12/2006 | Cheng et al. | |
| 2007/0047002 A1 | 3/2007 | Hull et al. | |
| 2007/0070053 A1* | 3/2007 | Lapstun | B43K 7/005 345/179 |
| 2007/0176908 A1* | 8/2007 | Lipman | G06F 3/0386 345/179 |
| 2007/0247425 A1 | 10/2007 | Liberty et al. | |
| 2008/0012835 A1* | 1/2008 | Rimon | G06F 3/038 345/173 |
| 2008/0036747 A1 | 2/2008 | Hope | |
| 2008/0166048 A1 | 7/2008 | Raif et al. | |
| 2008/0231613 A1 | 9/2008 | Tsai | |
| 2008/0309621 A1* | 12/2008 | Aggarwal | G06F 3/03545 345/173 |
| 2009/0078476 A1 | 3/2009 | Rimon et al. | |
| 2009/0115722 A1 | 5/2009 | Shan et al. | |
| 2009/0115744 A1 | 5/2009 | Zhang et al. | |
| 2009/0167728 A1* | 7/2009 | Geaghan | G06F 3/03542 345/179 |
| 2010/0013792 A1* | 1/2010 | Fukushima | G06F 3/03547 345/174 |
| 2010/0021022 A1* | 1/2010 | Pittel | G06F 3/03545 382/123 |
| 2010/0084468 A1* | 4/2010 | Lapstun | G06K 7/10772 235/454 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0238521 A1 | 9/2010 | Rusman et al. | |
| 2010/0259482 A1 | 10/2010 | Ball | |
| 2010/0262659 A1 | 10/2010 | Christiansen et al. | |
| 2010/0277327 A1 | 11/2010 | Lee | |
| 2010/0318895 A1 | 12/2010 | Steinberger et al. | |
| 2010/0321345 A1* | 12/2010 | Pearce | G06F 3/03545 345/179 |
| 2011/0012849 A1 | 1/2011 | Cho et al. | |
| 2011/0115741 A1 | 5/2011 | Lukas et al. | |
| 2011/0163972 A1 | 7/2011 | Anzures et al. | |
| 2011/0169756 A1 | 7/2011 | Ogawa et al. | |
| 2011/0193776 A1 | 8/2011 | Oda et al. | |
| 2011/0216091 A1* | 9/2011 | Song | G06F 3/033 345/634 |
| 2011/0241832 A1* | 10/2011 | Lipman | G06F 1/1626 340/6.1 |
| 2011/0241988 A1* | 10/2011 | Bensler | G06F 3/03545 345/158 |
| 2011/0242006 A1* | 10/2011 | Thompson | G06F 3/03545 345/173 |
| 2011/0258542 A1 | 10/2011 | Kenney et al. | |
| 2011/0304577 A1 | 12/2011 | Brown et al. | |
| 2012/0032880 A1 | 2/2012 | Kim et al. | |
| 2012/0032909 A1 | 2/2012 | Wang | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0194457 A1 | 8/2012 | Cannon et al. | |
| 2012/0212412 A1 | 8/2012 | Mizuno et al. | |
| 2012/0221938 A1 | 8/2012 | Patterson et al. | |
| 2012/0229428 A1* | 9/2012 | Tavakoli | G06F 3/03545 345/179 |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280911 A1 | 11/2012 | Su | |
| 2012/0280947 A1 | 11/2012 | Weaver et al. | |
| 2012/0280950 A1* | 11/2012 | Stephanick | G06F 3/0236 345/179 |
| 2012/0311438 A1 | 12/2012 | Cranfill et al. | |
| 2012/0327040 A1* | 12/2012 | Simon | G06F 3/044 345/179 |
| 2012/0329529 A1 | 12/2012 | van der Raadt | |
| 2012/0331546 A1* | 12/2012 | Falkenburg | G06F 3/03545 726/16 |
| 2013/0016045 A1 | 1/2013 | Zhao et al. | |
| 2013/0036383 A1 | 2/2013 | Yuan et al. | |
| 2013/0038579 A1 | 2/2013 | Boyd et al. | |
| 2013/0044083 A1 | 2/2013 | Basnett et al. | |
| 2013/0057505 A1 | 3/2013 | Yu et al. | |
| 2013/0063364 A1 | 3/2013 | Moore | |
| 2013/0063366 A1 | 3/2013 | Paul | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0082937 A1 | 4/2013 | Liu et al. | |
| 2013/0082976 A1 | 4/2013 | Kang | |
| 2013/0088464 A1* | 4/2013 | Pearce | G06F 3/03545 345/179 |
| 2013/0100022 A1 | 4/2013 | Thompson et al. | |
| 2013/0106714 A1 | 5/2013 | Shahparnia et al. | |
| 2013/0106719 A1 | 5/2013 | Sundara-Rajan et al. | |
| 2013/0106723 A1 | 5/2013 | Bakken et al. | |
| 2013/0106731 A1 | 5/2013 | Yilmaz et al. | |
| 2013/0106766 A1* | 5/2013 | Yilmaz | G06F 3/03545 345/174 |
| 2013/0106782 A1 | 5/2013 | Nowatzyk et al. | |
| 2013/0106796 A1 | 5/2013 | Yilmaz et al. | |
| 2013/0106798 A1* | 5/2013 | Sundara-Rajan | G06F 3/0383 345/179 |
| 2013/0106800 A1* | 5/2013 | Yilmaz | G06F 3/03545 345/179 |
| 2013/0113699 A1 | 5/2013 | Lim | |
| 2013/0113723 A1 | 5/2013 | Chen et al. | |
| 2013/0113762 A1 | 5/2013 | Geaghan | |
| 2013/0120271 A1 | 5/2013 | Lee et al. | |

(56) References Cited

U.S. PATENT DOCUMENTS

| | | | |
|---|---|---|---|
| 2013/0120463 A1* | 5/2013 | Harris | G06F 3/04883 345/661 |
| 2013/0135220 A1* | 5/2013 | Alameh | G06F 3/041 345/173 |
| 2013/0135234 A1 | 5/2013 | Hisano et al. | |
| 2013/0135262 A1* | 5/2013 | Alameh | G06F 3/0383 345/179 |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0162589 A1 | 6/2013 | Lien et al. | |
| 2013/0176247 A1 | 7/2013 | Jogo et al. | |
| 2013/0185680 A1 | 7/2013 | Chaudhri et al. | |
| 2013/0194308 A1 | 8/2013 | Privault et al. | |
| 2013/0201162 A1* | 8/2013 | Cavilia | G06F 3/03545 345/179 |
| 2013/0207937 A1* | 8/2013 | Lutian | G06F 3/042 345/175 |
| 2013/0229333 A1 | 9/2013 | Schwartz et al. | |
| 2013/0229389 A1 | 9/2013 | DiVerdi et al. | |
| 2013/0229390 A1* | 9/2013 | DiVerdi | G06F 3/0488 345/179 |
| 2013/0229391 A1 | 9/2013 | Diverdi | |
| 2013/0285934 A1 | 10/2013 | Ting et al. | |
| 2013/0321305 A1 | 12/2013 | Liang et al. | |
| 2013/0321360 A1 | 12/2013 | Huang | |
| 2014/0002422 A1* | 1/2014 | Stern | G06F 3/03545 345/179 |
| 2014/0028577 A1 | 1/2014 | Krah et al. | |
| 2014/0028634 A1* | 1/2014 | Krah | G06F 3/041 345/179 |
| 2014/0049467 A1 | 2/2014 | Laligand et al. | |
| 2014/0078116 A1 | 3/2014 | Mercea et al. | |
| 2014/0085269 A1 | 3/2014 | Armstrong-Muntner | |
| 2014/0092069 A1* | 4/2014 | Bentov | G06F 1/26 345/179 |
| 2014/0098033 A1* | 4/2014 | Simmons | G06F 3/03545 345/173 |
| 2014/0104224 A1 | 4/2014 | Ih et al. | |
| 2014/0111426 A1 | 4/2014 | Inamoto et al. | |
| 2014/0146021 A1 | 5/2014 | Trethewey et al. | |
| 2014/0150026 A1 | 5/2014 | Mountain | |
| 2014/0160089 A1 | 6/2014 | Fletcher et al. | |
| 2014/0168175 A1* | 6/2014 | Mercea | G06F 3/03545 345/179 |
| 2014/0168176 A1* | 6/2014 | Nowatzyk | G06F 3/03545 345/179 |
| 2014/0192028 A1 | 7/2014 | Leydon | |
| 2014/0210797 A1* | 7/2014 | Kreek | G06F 3/0488 345/179 |
| 2014/0232693 A1 | 8/2014 | Schuckle et al. | |
| 2014/0267120 A1 | 9/2014 | Zhang et al. | |
| 2014/0347329 A1* | 11/2014 | Ware | G06F 3/0383 345/179 |
| 2015/0002486 A1 | 1/2015 | Valícek et al. | |
| 2015/0029162 A1 | 1/2015 | Harris et al. | |
| 2015/0040243 A1 | 2/2015 | Mittal | |
| 2015/0074578 A1 | 3/2015 | Liang et al. | |
| 2015/0103040 A1 | 4/2015 | Huang et al. | |
| 2015/0169059 A1 | 6/2015 | Behles et al. | |
| 2015/0205479 A1 | 7/2015 | Zhu et al. | |

OTHER PUBLICATIONS

"Adonit Jot Touch (for iPad)," Adonit Jot Touch (for iPad) Review & Rating—PCMag.com; http://www.pcmag.com/article2/0,2817, 2411192,00.asp; 6pages, printed from the Internet on Jun. 20, 2013.
Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.
"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.
"Bamboo Stylus," Wacom Americas, http://www.wacom.com/en/products/stylus, 5 pages, printed from the Internet on Jun. 20, 2013.
Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.
Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.
"Pen," DuoSense Pen, N-trig Hands-on computing, http://www.n-trig.com/Content.aspx?Page=DigitalPencil, 3 pages, printed from the Internet on Jun. 20, 2013.
"Easing functions," Easing Functions Cheat Sheet, http://easings.net/, 3 pages, printed from the Internet on Jun. 17, 2013.
Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.
"explaining how the sPen tech works (and is very diff than other styluses)," http://forum.xda-developers.com/showthread_php?t=, 1 page, printed from the Internet on Jan. 15, 2013.
"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.
"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.
"Guidelines for selecting text and images (Windows Store apps)," http://msdn.microsoft.com/en-us/library/windows/apps/hh465334, 5 pages, printed from the Internet on Jun. 20, 2013.
Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.
"How do WACOM tablets work?," tablet4u.co.uk, http://www.tablet4u.co.uk/techinfo.html, 2 pages, printed from the Internet on Jun. 20, 2013.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.
"Padblue 2," BRANDO—mobile.brando.com, http://mobile.brando.com/Padblue-2_p9162c1577d94.html., 4 pages, printed from the Internet on May 10, 2013.
Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

(56) References Cited

OTHER PUBLICATIONS

"Bluetooth 4.0 SmartPen the future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.cominew-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php? prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA—Touch Switches," PAiA Corporation USA, file:///S/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.

* cited by examiner

STYLUS SENSITIVE DEVICE WITH HOVER OVER STYLUS CONTROL FUNCTIONALITY

FIELD OF THE DISCLOSURE

This disclosure relates to electronic display devices, and more particularly, to user interface techniques for interacting with stylus sensitive computing devices.

BACKGROUND

Electronic display devices such as tablets, eReaders, mobile phones, smart phones, personal digital assistants (PDAs), and other such stylus sensitive electronic display devices are commonly used for displaying consumable content. The content may be, for example, an eBook, an online article or blog, images, documents, a movie or video, just to name a few types. Such display devices are also useful for displaying a user interface that allows a user to interact with files or other content on the device. The user interface may include, for example, one or more screen controls and/or one or more displayed labels that correspond to nearby hardware buttons. The user may interact with the touch/stylus sensitive device using fingers, a stylus, or other implement. The display may be backlit or not, and may be implemented for instance with an LCD screen or an electrophoretic display. Such devices may also include other contact sensitive surfaces, such as a track pad (e.g., capacitive or resistive sensor) or contact sensitive housing (e.g., acoustic sensor).

DETAILED DESCRIPTION

Figure 1A:
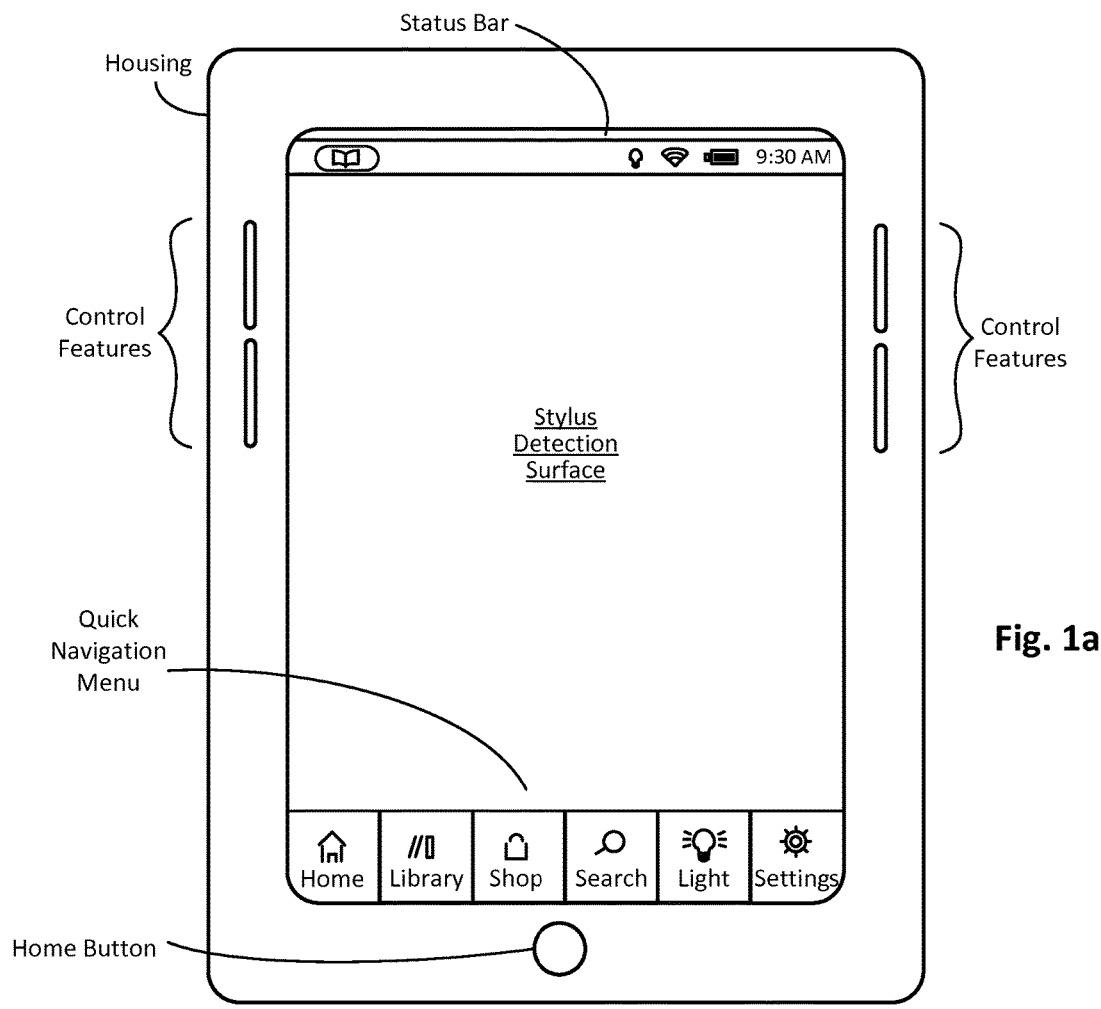
FIGS. 1a-b illustrate an example electronic computing device with a stylus detection surface configured to detect stylus hover over actions, in accordance with an embodiment of the present invention.

Techniques are disclosed for performing functions in electronic devices using stylus control feature actions while the stylus is hovering over a stylus detection surface. The stylus hover over actions may be configured to perform various configurable and/or hard-coded functions. The stylus detection surface may be, for example, incorporated into a stylus sensitive display, or may be a separate stylus detection surface associated with the display of the electronic computing device. A stylus hover over action may include manipulating one or more control features of the stylus, and each control feature action or combination of actions may be associated with a distinct function. In some cases, the stylus detection surface may detect whether the stylus is pointing to specific content on the device and the stylus hover over actions may perform functions on selected content or on one or more UI control features or icons on the device. In other cases, no specific content selection is needed; rather, the function performed is selection-free. In some embodiments, the device may track the stylus location over the stylus detection surface and the stylus hover over action may be location sensitive. In such an example, a stylus hover over action may perform different functions depending on the stylus' location above the stylus detection surface. The various functions assigned to hover over stylus actions may be performed on a content specific level, an application specific level, or a global device level. An animation can be displayed as the stylus hover over actions perform various functions on the device.

General Overview

As previously explained, electronic display devices such as tablets, eReaders, and smart phones are commonly used for displaying user interfaces and consumable content. In typical operation, the user might desire to, for example, adjust volume, open a file, change screen settings, switch application, perform the undo, copy, paste, or delete functions, or otherwise interact with a given electronic device. While most electronic devices typically provide a series of direct contact actions for performing these various tasks, there does not appear to be an intuitive hover over stylus control feature based user interface function for performing such tasks.

Thus, and in accordance with an embodiment of the present invention, stylus-based techniques are provided for performing functions in electronic devices using stylus control feature actions while the stylus is hovering over a stylus detection surface. The techniques disclosed may be used to perform functions at an electronic device by manipulating control features of a stylus without requiring direct contact between the stylus and the electronic device. A stylus hover over control feature action, such as pushing the top button of the stylus, may be associated with a function such as increasing volume, increasing font size, creating a note (e.g., such as notes taken during an educational lecture, or a message for another user of the device, or a reminder, etc), undo, recording a lecture or other ambient sounds, etc. In a more general sense, any uniquely identifiable stylus control feature action or combination of actions performed while hovering over a stylus detection surface may be configured to perform a stylus or device function. In some embodiments, the stylus may be pointing to a specific selection of content, a UI control feature or icon, or a specific area of a stylus sensitive display. In such an example, the stylus hover over action may be used to perform an operation on the selected content, open the selected file or application, manipulate the UI control feature, etc. In one specific such example, a stylus hover over action may be associated with a different function depending on the area of the screen over which the stylus is hovering. In other embodiments, the stylus hover over action may be configured to perform a certain function regardless of whether content is selected or where the stylus is pointing. In some such selection-free embodiments, the stylus hover over action may perform a certain function based on a currently running application, or a specific stylus control feature may be globally associated with a specific device function. Numerous selection-free hover over stylus actions will be apparent in light of this disclosure, and such functions may be user-configurable or hard-coded.

In some embodiments, the hover over stylus action may be combined with or otherwise preceded by a content selection action (e.g., a single item selection, a select-and-drag action, a book-end selection where content between two end points is selected, or any other available content selection technique). As will be appreciated, the stylus may be used to make the content selection, but it need not be; rather, content may be selected using any means. In one example embodiment, the user may select a section of text, and then perform the copy function (or other function assigned to a stylus control feature), which will save the selected text onto the stylus. In a more general sense, the stylus may be used to perform functions on content that was pre-selected with or without the stylus, or to simultaneously select and perform functions on target content. The degree to which the selection and other functions overlap may vary depending on factors such as the type of content and the processing capability of the stylus and/or related device.

In some example embodiments, the hover over stylus actions are accompanied with animation, sound and/or haptic effects to further enhance the user interface experience. For example, copy animation might show a vortex or sucking of the selected content into the stylus if the stylus hover over action is being used to copy content into the stylus or other target location. In a similar fashion, a volume increase animation might show a speaker with an increasing number of sound waves coming from it if the stylus hover over action is being used to increase volume. If a selection-free no-contact undo stylus action is being executed, then a sound could accompany the undo function, such as a custom sound selected by the user, or any other suitable sound. A combination of animation, sound, haptic, and/or other suitable notifications can be used as well, as will be appreciated in light of this disclosure.

The techniques have a number of advantages, as will be appreciated in light of this disclosure. For instance, in some cases, the techniques can be employed to provide a discreet and intuitive way for a user to interact with a device without overly distracting the user (or others nearby) from other events occurring during the interaction. For instance, in some such embodiments, a student attending a lecture (either live or via a network) can activate note taking and voice recording applications via non-touch stylus-based control actions, without having to look at the device (or with minimal looking). In such cases, for instance, the student can hold the stylus generally over the stylus sensitive surface while still maintaining focus and concentration on the lecturer and presentation materials, and readily activate tools that can supplement the educational experience.

Numerous uniquely identifiable engagement and notification schemes that exploit a stylus and a stylus detection surface to effect desired functions without requiring direct contact on the touch sensitive surface can be used, as will be appreciated in light of this disclosure. Further note that any stylus detection surface (e.g., track pad, touch screen, electro-magnetic resonance (EMR) sensor grid, or other stylus sensitive surface, whether capacitive, resistive, acoustic, or other stylus detecting technology) may be used to detect the stylus hover over action and the claimed invention is not intended to be limited to any particular type of stylus detection technology, unless expressly stated.

Architecture

Figure 1B:
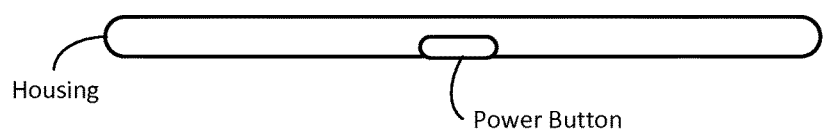

FIGS. 1a-b illustrate an example electronic computing device with a stylus detection surface configured to detect stylus hover over actions, in accordance with an embodiment of the present invention. As can be seen, in this example embodiment, the stylus detection surface is a touch screen surface. The device could be, for example, a tablet such as the NOOK® tablet or eReader by Barnes & Noble. In a more general sense, the device may be any electronic device having a stylus detection user interface and capability for displaying content to a user, such as a mobile phone or mobile computing device such as a laptop, a desktop computing system, a television, a smart display screen, or any other device having a stylus detection display or a non-sensitive display screen that can be used in conjunction with a stylus detection surface. In a more general sense, the touch sensitive device may comprise any touch sensitive device with built-in componentry to accept/recognize input from a stylus with which the device can be paired so as to allow for stylus input, including stylus hover over functionality as described herein. As will be appreciated, the claimed invention is not intended to be limited to any particular kind or type of electronic device.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such user interface (UI) features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
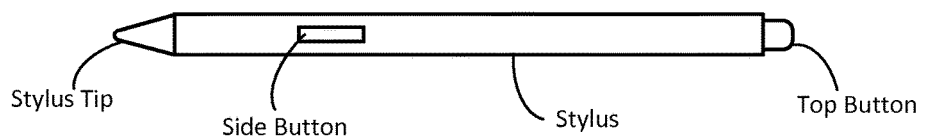
FIG. 1c illustrates an example stylus for use with an electronic computing device, configured in accordance with an embodiment of the present invention.

FIG. 1c illustrates an example stylus for use with an electronic computing device configured in accordance with an embodiment of the present invention. As can be seen, in this particular configuration, the stylus comprises a stylus tip used to interact with the stylus detection surface (by either direct contact or hover over interaction, or otherwise sufficiently proximate indirect contact) and control features including a top button and a side button along the shaft of the stylus. In this example, the stylus tip has a rounded triangular shape, while in alternative embodiments the stylus tip may be more rounded, or any other suitable shape. The stylus tip may be made of any number of materials of different textures and firmness depending on the needs of the specific device. The stylus may include fewer or additional control features than the top and side buttons illustrated in FIG. 1c, or different control features altogether. Such control features may include, for example, a rotating knob, a switch, a sliding control bar, or other suitable control feature that will be apparent in light of this disclosure. The principles disclosed herein equally apply to such control features. For ease of description, stylus examples are provided with push button control features. The stylus may be an active or passive stylus, or any other suitable pen-like implement for interacting with the device and performing hover over actions. As will be appreciated, the claimed invention is not intended to be limited to any particular kind or type of stylus.

Figure 1D:
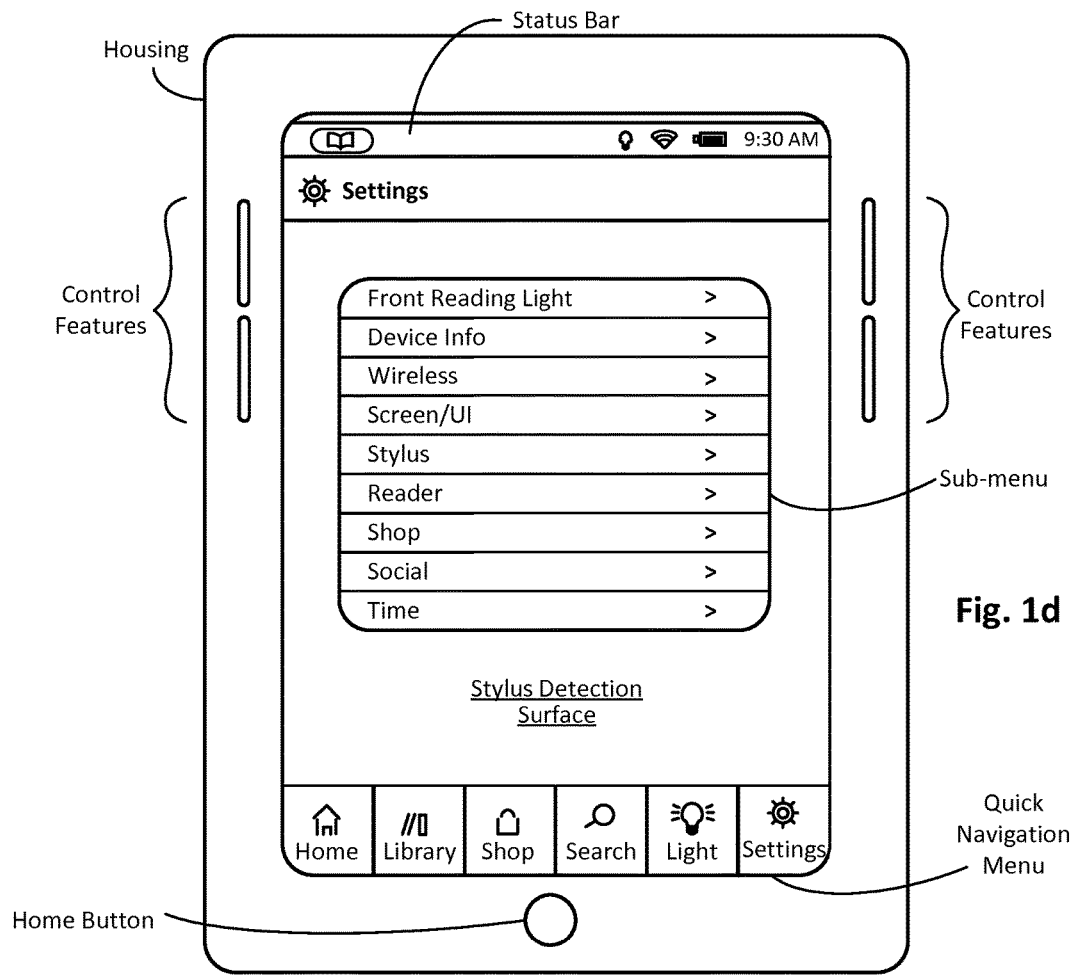
FIGS. 1d-e illustrate example configuration screen shots of the user interface of the electronic device shown in FIGS. 1a-b, configured in accordance with an embodiment of the present invention.
Figure 1E:
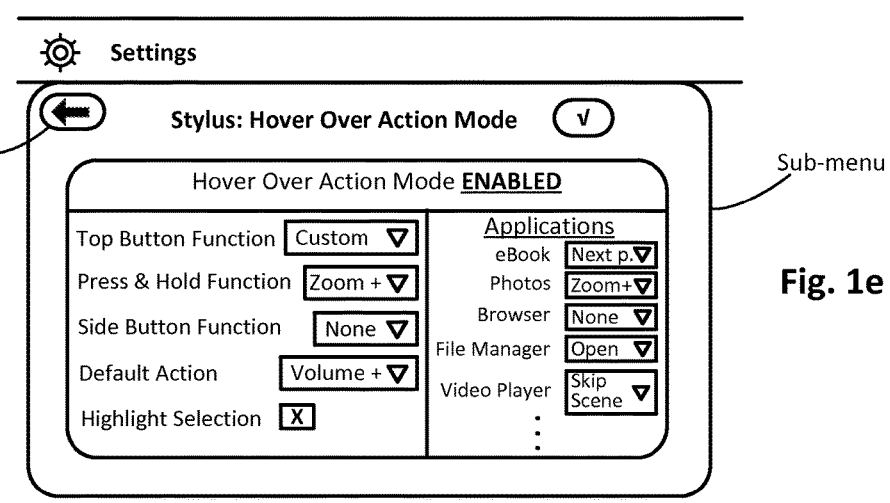

In one particular embodiment, a stylus hover over action configuration sub-menu, such as the one shown in FIG. 1e, may be accessed by selecting the Settings option in the quick navigation menu, which causes the device to display the general sub-menu shown in FIG. 1d. From this general sub-menu, the user can select any one of a number of options, including one designated Stylus in this specific example case. Selecting this sub-menu item may cause the configuration sub-menu of FIG. 1e to be displayed, in accordance with an embodiment. In other example embodiments, selecting the Stylus option may present the user with a number of additional sub-options, one of which may include a so-called "stylus hover over action" option, which may then be selected by the user so as to cause the stylus hover over action configuration sub-menu of FIG. 1e to be displayed. Any number of such menu schemes and nested hierarchies can be used, as will be appreciated in light of this disclosure. In other embodiments, the stylus hover over action function can be hard-coded such that no configuration sub-menus are needed or otherwise provided (e.g., top button click while hovering over the device for carrying out actions as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch (e.g., finger or stylus) in a given location into an electrical signal which is then received and processed by the underlying operating system (OS) and circuitry (processor, etc). Additional example details of the underlying OS and circuitry in accordance with some embodiments will be discussed in turn with reference to FIG. 2a.

The stylus detection surface (or stylus detection display, in this example case) can be any surface that is configured with stylus detecting technologies capable of non-contact detection, whether capacitive, resistive, acoustic, active-stylus, and/or other input detecting technology. The screen display can be layered above input sensors, such as a capacitive sensor grid for passive touch-based input such as with a finger or passive stylus in the case of a so-called in-plane switching (IPS) panel, or an electro-magnetic resonance (EMR) sensor grid. In some embodiments, the stylus detection display can be configured with a purely capacitive sensor, while in other embodiments the touch screen display may be configured to provide a hybrid mode that allows for both capacitive input and EMR input, for example. In still other embodiments, the stylus detection surface is configured with only an active stylus sensor. Numerous touch screen display configurations can be implemented using any number of known or proprietary screen based input detecting technologies. In any such embodiments, a stylus detection surface controller may be configured to selectively scan the stylus detection surface and/or selectively report stylus inputs detected proximate to (e.g., within a few centimeters, or otherwise sufficiently close so as to allow detection) the stylus detection surface.

In one example embodiment, a stylus input can be provided by the stylus hovering some distance above the stylus detection display (e.g., one to a few centimeters above the surface, or even farther, depending on the sensing technology deployed in the stylus detection surface), but nonetheless triggering a response at the device just as if direct contact were provided directly on the display. As will be appreciated in light of this disclosure, a stylus as used herein may be implemented with any number of stylus technologies, such as a DuoSense® pen by N-Trig® (e.g., wherein the stylus utilizes a touch sensor grid of a touch screen display) or EMR-based pens by Wacom technology, or any other commercially available or proprietary stylus technology. Further recall that the stylus sensor in the computing device may be distinct from an also provisioned touch sensor grid in the computing device. Having the touch sensor grid separate from the stylus sensor grid allows the device to, for example, only scan for an stylus input, a touch contact, or to scan specific areas for specific input sources, in accordance with some embodiments. In one such embodiment, the stylus sensor grid includes a network of antenna coils that create a magnetic field which powers a resonant circuit within the stylus. In such an example, the stylus may be powered by energy from the antenna coils in the device and the stylus may return the magnetic signal back to the device, thus communicating the stylus' location above the device, angle of inclination, speed of movement, and control feature activation (e.g., push-button action). Such an embodiment also eliminates the need for a battery on the stylus because the stylus can be powered by the antenna coils of the device. In one particular example, the stylus sensor grid includes more than one set of antenna coils. In such an example embodiment, one set of antenna coils may be used to merely detect the presence of a hovering or otherwise sufficiently proximate stylus, while another set of coils determines with more precision the stylus' location above the device and can track the stylus' movements.

As previously explained, and with further reference to FIGS. 1d and 1e, once the Settings sub-menu is displayed (FIG. 1d), the user can then select the Stylus option. In response to such a selection, the stylus hover over action configuration sub-menu shown in FIG. 1e can be provided to the user. The user can configure a number of functions with respect to the stylus hover over action function, in this example embodiment. For instance, in this example case, the configuration sub-menu includes a UI check box that when checked or otherwise selected by the user, effectively enables the stylus hover over action mode (shown in the enabled state); unchecking the box disables the mode. Other embodiments may have the stylus hover over action mode always enabled, or enabled by a physical switch or button located on either the device or the stylus, for example. In addition, the stylus of this example case includes a top button and a side button, and once the hover over action mode is enabled, the user can associate a function with each of the buttons using a drop down menu, for example. Examples of possible functions include, select content/icon, run application, cut, copy, delete, undo, redo, next page, zoom in/out, adjust font size, adjust brightness, adjust volume, switch tool or application, skip scene, create a note (on device), or start an audio or video recording of a classroom lecture or other event (from device or stylus if stylus is configured to record/store sounds/video). Hover over action functions may be configured on a content specific level, an application specific level, or on a global level wherein the action performs the same function regardless of the application running or type of content currently displayed at the time, and regardless of whether content is selected. In this particular example, the top button is configured to perform a custom function based on the application currently running (application specific functionality will be discussed in further detail below), while the side button is not associated with any hover over function. The press-and-hold action on the top button is associated with zooming in, in this particular example embodiment. A default top button press is associated with the increase volume function in this particular example. In such an example, the default function of increasing volume may be performed if an application specific function is not assigned to the hover over action, or if no application is currently running.

With further reference to the example embodiment of FIG. 1e, the user may also specify a number of applications in which the stylus hover over action mode can be invoked. Such a configuration feature may be helpful, for instance, in a tablet or laptop or other multifunction computing device that can execute different applications (as opposed to a device that is more or less dedicated to a particular application). In this example case, the available applications are provided along with a corresponding pull-down menu, but could be a UI check box or some other suitable UI feature.

Note the diverse nature of the example applications, including an eBook application, a photo viewing application, a browser application, a file manager application, and a video player, just to name a few examples. In this example case, the hover over stylus action is associated with the next page function when an eBook is running, with the zoom-in function when a photo viewing/editing application is running, with no custom function when a browser application is running, with the open function when a file manager application is running, and with the skip scene function when a video player application is running. In other embodiments, multiple stylus control features may be associated with distinct functions for different applications. In one such example embodiment, in a word processing application a selection-free control feature action may be associated with the undo function, a side button action may be associated with copying selected content, and a top button action may be associated with the paste function.

In some embodiments the user may also enable a highlight selection option, which may highlight content when the stylus is pointing toward that content while hovering over the stylus detection surface. Such a feature can apply when the user is opening an application from a list of possible applications. In this particular embodiment shown in FIG. 1e, the highlight mode is enabled and the application, document, selection of text, etc. upon which the stylus hover over action will be performed is highlighted. As used here, highlighting may refer, for example, to any visual and/or aural indication of a content selection, which may or may not include a formatting change. In one particular embodiment, the stylus hover over action may be associated with opening a file and the highlighting function may outline a particular file that the stylus is pointing toward, thus indicating that a control feature action at that moment will open that particular file.

In other embodiments, the hover over action mode can be invoked whenever the stylus is activated, regardless of the application being used. Any number of applications or device functions may benefit from a stylus hover over action mode as provided herein, whether user-configurable or not, and the claimed invention is not intended to be limited to any particular application or set of applications.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Numerous other configurable aspects will be apparent in light of this disclosure. For instance, in some embodiments, the stylus hover over action function can be assigned on a context basis. For instance, the configuration menu may allow the user to assign the top button to copy entire files or emails and assign the side button to copy within a given file. Thus, the techniques provided herein can be implemented on a global level, a content based level, or an application level, in some example cases. Note that in some embodiments the various stylus actions may be visually demonstrated to the user as they are carried out via copy, delete, or other suitable function animations. Such animations provide clarity to the function being performed, and in some embodiments the animations may be user-configurable while they may be hard-coded in other embodiments.

Figure 2A:
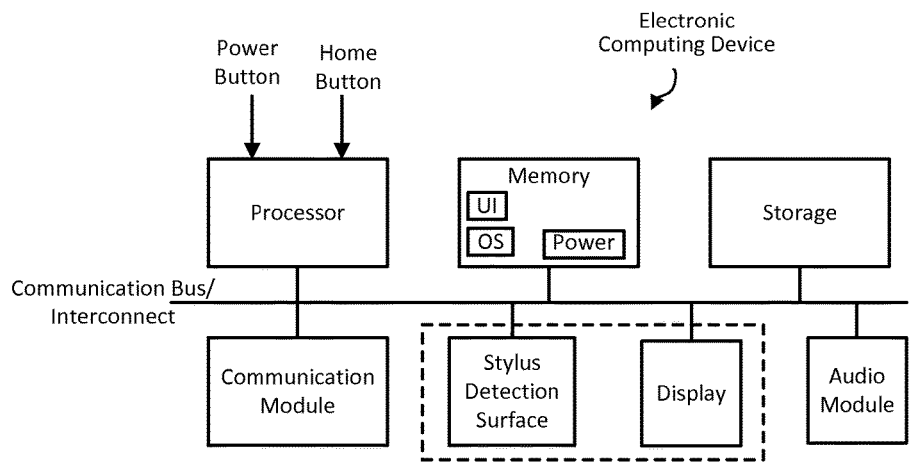
FIG. 2a illustrates a block diagram of an electronic computing device with a stylus sensitive display, configured in accordance with an embodiment of the present invention.

FIG. 2a illustrates a block diagram of an electronic computing device with a stylus sensitive display, configured in accordance with an embodiment of the present invention. As can be seen, this example device includes a processor, memory (e.g., RAM and/or ROM for processor workspace and storage), additional storage/memory (e.g., for content), a communications module, a display, a stylus detection surface, and an audio module. A communications bus and interconnect is also provided to allow inter-device communication. Other typical componentry and functionality not reflected in the block diagram will be apparent (e.g., battery, co-processor, etc.). Further note that in some embodiments the stylus detection surface may be integrated into the device display. Alternatively, the stylus detection surface may be a track pad, a housing configured with one or more acoustic sensors, a separate stylus sensitive surface that may be connected to the device via cables or a wireless link, etc. As discussed above, the stylus detection surface may employ any suitable input detection technology that is capable of translating an action of a stylus hovering over the surface into an electronic signal that can be manipulated or otherwise used to trigger a specific user interface action, such as those provided herein. The principles provided herein equally apply to any such stylus sensitive devices. For ease of description, examples are provided with stylus sensitive displays.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a hover over stylus action function as described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch E-ink Pearl 800×600 pixel screen with Neonode® zForce® touch screen, or any other suitable display and touch screen interface technology. The communications module can be configured to execute, for instance, any suitable protocol which allows for connection to the stylus so that hover over stylus actions may be detected by the device, or to otherwise provide a communication link between the device and the stylus or other external systems. Note in some cases that slider actions of the stylus are communicated to the device by virtue of the stylus detection surface and not the communication module. In this sense, the communication module may be optional. Example communications modules may include an NFC (near field connection), Bluetooth, 802.11 b/g/n WLAN, or other suitable chip or chip set that allows for wireless connection to the stylus (including any custom or proprietary protocols). In some embodiments, a wired connection can be used between the stylus and device. In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured, for example, to automatically transition the device to a low power consumption or sleep mode after a period of non-use. A wake-up from that sleep mode can be achieved, for example, by a physical button press and/or a stylus hover over action, a touch screen swipe or other action. The user interface (UI) module can be programmed or otherwise configured, for example, to carryout user interface functionality, including that functionality based on stylus action detection as discussed herein and the various example screen shots shown in FIGS. 1a, 1d-e, 3a-b, 4a-b, and 5a-c, in conjunction with the stylus-based methodologies demonstrated in FIG. 6, which will be discussed in turn. The audio module can be configured, for example, to speak or otherwise aurally present a selected eBook table of contents or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Figure 2B:
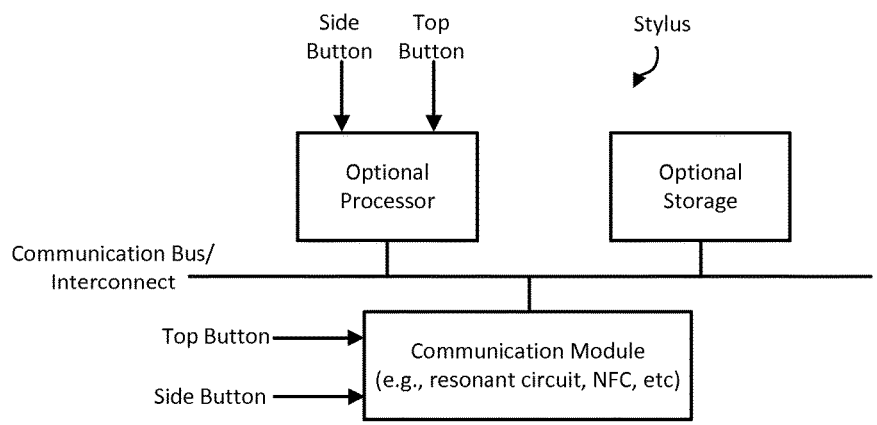
FIG. 2b illustrates a block diagram of a stylus configured in accordance with an embodiment of the present invention.

FIG. 2b illustrates a block diagram of a stylus configured in accordance with an embodiment of the present invention. As can be seen, this example stylus includes a storage/memory and a communication module. A communications bus and interconnect may be provided to allow inter-device communication. An optional processor may also be included in the stylus to provide local intelligence, but such is not necessary in embodiments where the electronic computing device with which the stylus is communicatively coupled provides the requisite control and direction. Other componentry and functionality not reflected in the block diagram will be apparent (e.g., battery, speaker, antenna, etc). The optional processor can be any suitable processor and may be programmed or otherwise configured to assist in controlling the stylus, and may receive input from the user from control features including a top and side button. The storage may be implemented with any suitable memory and size (e.g., 2 to 4 GBytes of flash memory). In other example embodiments, storage/memory on the stylus itself may not be necessary.

The communications module can be, for instance, any suitable module which allows for connection to a nearby electronic device so that information may be passed between the device and the stylus. Example communication modules may include an NFC, Bluetooth, 802.11b/g/n WLAN, or other suitable chip or chip set which allows for connection to the electronic device. In other embodiments, the communication module of the stylus may implement EMR or other similar technologies that can communicate stylus information to a device, including stylus location and whether a stylus action has been performed, without a separate communications chip or chip set. In one such example, the stylus may include a communication module comprising a resonator circuit that may be manipulated using the various control features of the stylus. In such an example, performing hover over actions with the stylus may be accomplished by using a control feature to adjust the resonant frequency of the resonator circuit. The altered resonant frequency may be detected by, for example, an EMR detection grid of the stylus detection surface of the device, thus triggering a response at the device. Note in such a case that a separate dedicated communication module may be optional.

In another example case, the communications module may receive input from the user from control features including a top and side button, wherein such inputs can be used to enable the various functions of the communications module. As will be appreciated, commands may be communicated and/or target content may be transferred between (e.g., copied or cut or pasted) the stylus and the electronic device over a communication link. In one embodiment, the stylus includes memory storage and a transceiver, but no dedicated processor. In such an embodiment, the processor of the electronic device communicates with the transceiver of the stylus and performs the various functions as indicated by the user.

Figure 2C:
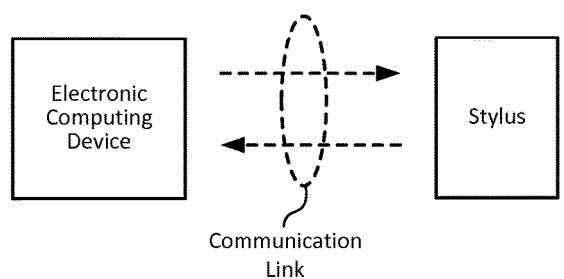
FIG. 2c illustrates a block diagram of a communication link between the electronic computing device of FIG. 2a and the stylus of FIG. 2b, configured in accordance with an embodiment of the present invention.

FIG. 2c illustrates a block diagram showing a communication link between the electronic computing device of FIG. 2a and the stylus of FIG. 2b, according to one embodiment of the present invention. As can be seen, the system generally includes an electronic computing device that is capable of wirelessly connecting to other devices and a stylus that is also capable of wirelessly connecting to other devices. In this example embodiment, the electronic computing device may be, for example, an e-Book reader, a mobile cell phone, a laptop, a tablet, desktop, or any other stylus sensitive computing device. As described above, the communication link may include an NFC, Bluetooth, 802.11b/g/n WLAN, electro-magnetic resonance, and/or other suitable communication link which allows for communication between one or more electronic devices and a stylus. In some embodiments, EMR technology may be implemented along with one or more of NFC, Bluetooth, 802.11b/g/n WLAN, etc. In one such example, EMR may be used to power a stylus and track its location above a device while NFC may enable data transfer between the stylus and the device. In some embodiments, the stylus may be configured in real-time over the communication link. In one such example, the user may adjust stylus configuration settings using the various menus and sub-menus such as those described in FIGS. 1d-e and the stylus may be reconfigured in real-time over the communication link.

Example Stylus Hover Over Action Functions

Figure 3A:
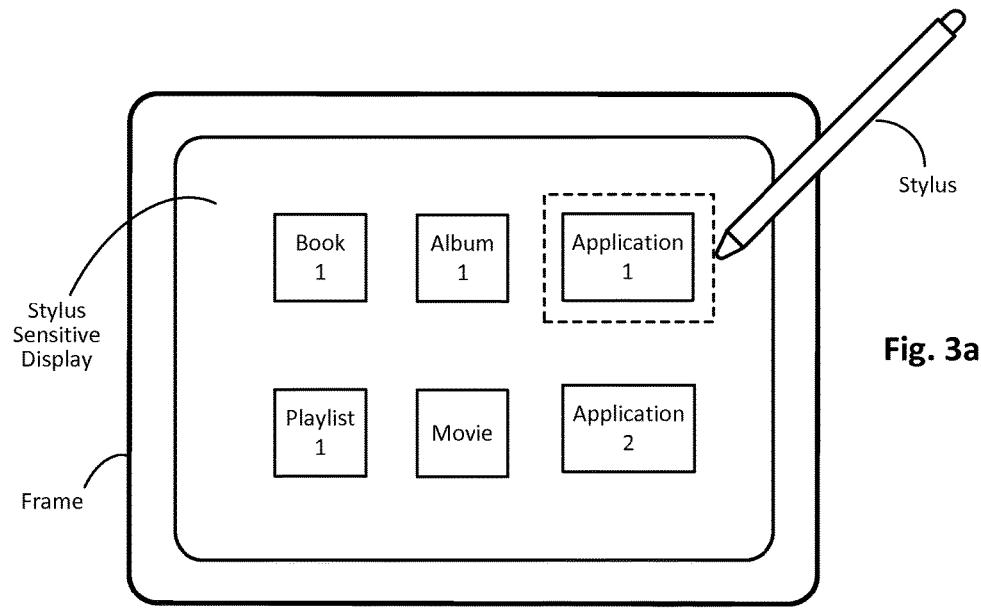
FIGS. 3a-b illustrate an example of an electronic stylus sensitive device and stylus wherein a stylus hover over action opens an application, in accordance with an embodiment of the present invention.
Figure 3B:
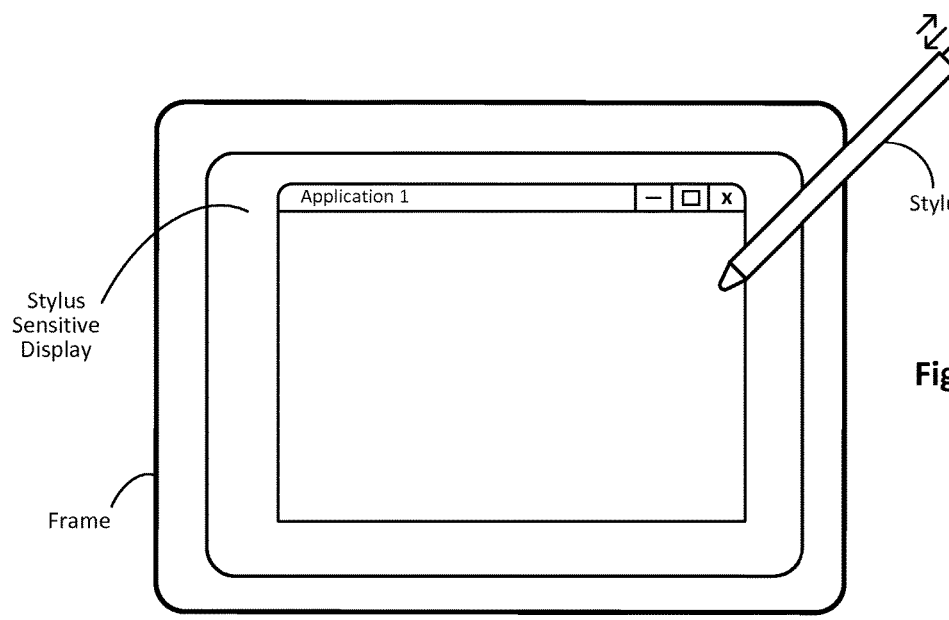

FIGS. 3a-b illustrate an example of an electronic stylus sensitive device and stylus wherein a stylus hover over action opens an application, in accordance with an embodiment of the present invention. As can be seen, a physical frame or support structure is provided about the stylus sensitive display, and the screen is displaying a book, playlist, album, movie, and two applications. In this particular example scenario, the top button of the stylus is associated with the open function (e.g., hard-coded or via a configuration sub-menu) and the user has selected Application 1. Application 1 may be selected in any suitable manner using the stylus, the user's finger, or any other selection method (note that selection of the Application 1 may have been pre-established prior to the open action, or at the same time as the open action such as the case when the stylus is pointing at the target content to be acted upon in response to the hovering control action). In this example case, the hover over action mode is enabled (e.g., as described in reference to FIG. 1e, or hard-coded) and the user has pointed the stylus toward Application 1 while hovering over the device, thus causing Application 1 to be outlined as shown. Such optional highlighting may assist the user in identifying what file or application will be opened before performing the action.

In the example shown in FIG. 3b, when the user presses and releases the top button of the stylus, the device opens Application 1, as shown. In this particular example, the open function is performed upon release of the button and the stylus must remain hovering sufficiently proximate to the stylus detection surface until the button is released. In some such example scenarios, if the user decides not to open Application 1 after pressing the button, the user may remove the stylus away from the touch screen before releasing the button, and the application will not be opened. In another example case, the opening function can be performed as soon as the stylus button is pressed, and as long as the communication link can be maintained, the open action will be carried out and the target application or file will be opened. In other embodiments, upon release of the stylus button, an action may be automatically performed on a file or application. For instance, a file may be sent to trash, sent to a designated folder, or deleted, in some such embodiments. As previously explained, the resulting action may be user-configurable or hard-coded.

Figure 4A:
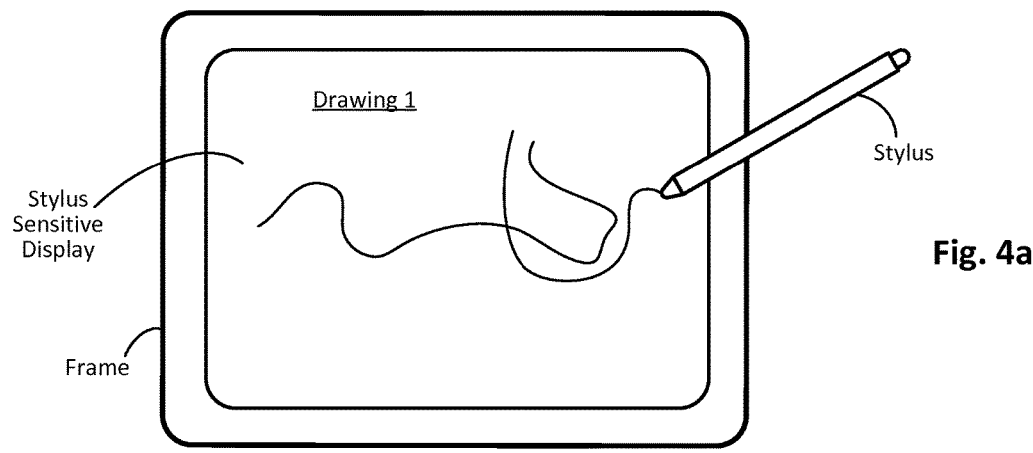
FIGS. 4a-b illustrate an example of an electronic stylus sensitive device and stylus wherein a selection-free stylus hover over action performs the undo function, in accordance with an embodiment of the present invention.
Figure 4B:
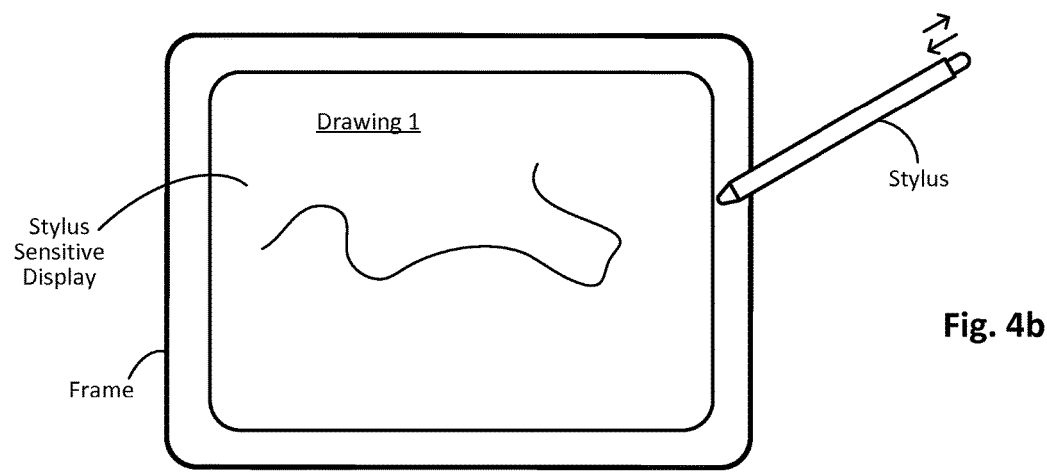

FIGS. 4a-b illustrate an example of an electronic stylus sensitive device and stylus wherein a selection-free stylus hover over action performs the undo function, in accordance with an embodiment of the present invention. As seen in this example, a stylus sensitive display screen is displaying a drawing, Drawing 1, including lines drawn by the stylus. In the example shown in FIG. 4a, the user has just finished drawing a second line on Drawing 1 with the stylus. In this particular example, the top button of the stylus is associated with the undo function (e.g., hard-coded or via a configuration sub-menu) and there is no content selection prior to performing the undo function.

In the example shown in FIG. 4b, the user has removed the stylus from direct contact with the stylus sensitive display after drawing the second line and has subsequently pressed and released the top button of the stylus while the stylus is hovering over, or otherwise sufficiently proximate to, the surface of the device. The top button is associated with the undo function, thus the most recent action by the user is undone. As can be seen, in this specific example the second line drawn on Drawing 1 is removed. In this particular example, the undo action is performed upon release of the button and the stylus must remain sufficiently proximate to the stylus detection surface until the button is released. In such an example, if the user decides not to perform the undo action after pressing the button, the user may move the stylus away from the stylus sensitive display before releasing the button, and the undo action will effectively be canceled. In other embodiments, the undo function can commence immediately upon pressing of the stylus button and the stylus need only remain communicatively coupled with the device. As previously explained, the various stylus actions may be user-configurable or hard-coded.

Figure 5A:
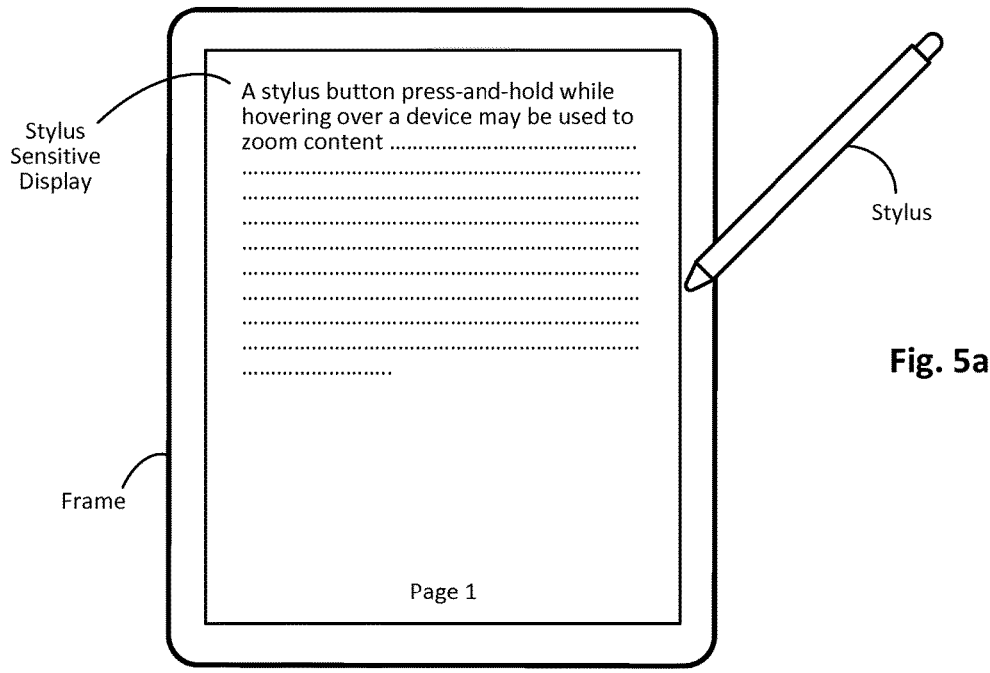
FIGS. 5a-c illustrate an example of an electronic stylus sensitive device and stylus configured to perform stylus hover over actions, in accordance with an embodiment of the present invention.
Figure 5B:
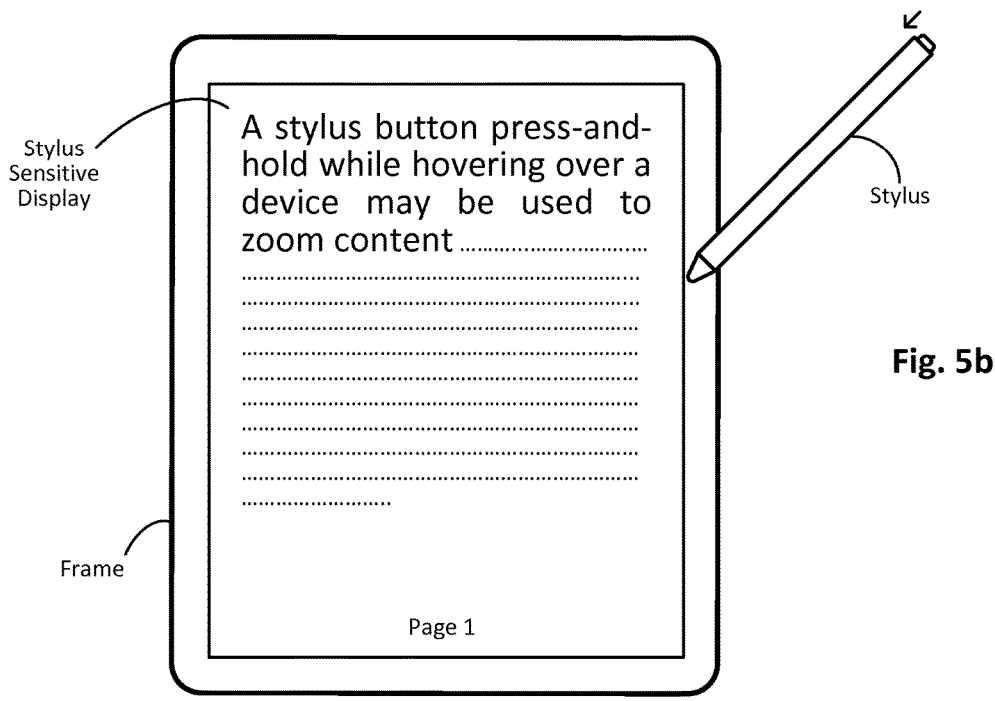
Figure 5C:
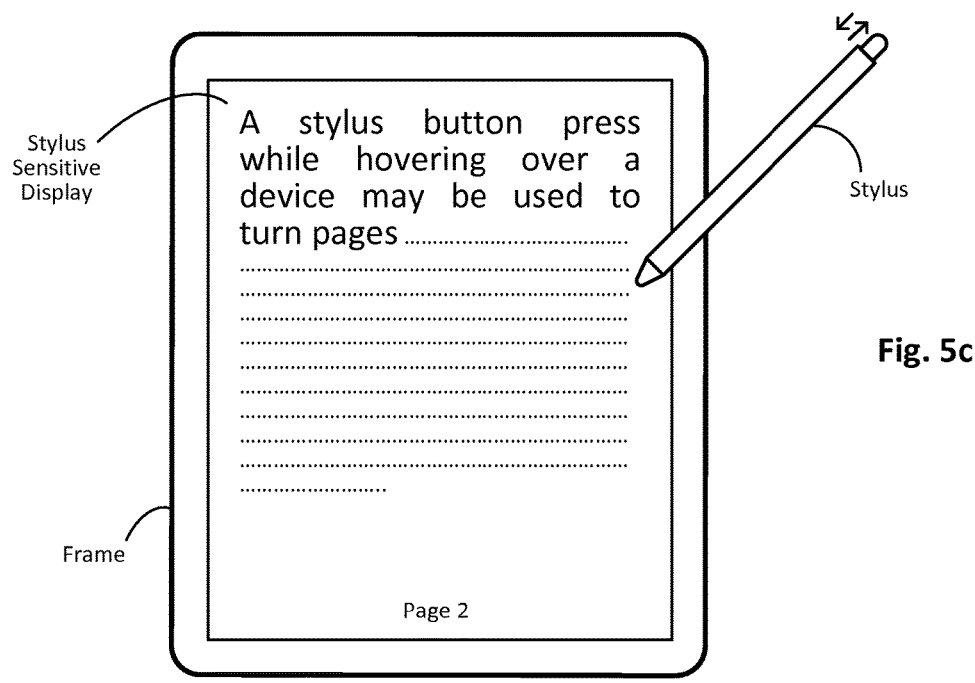

FIGS. 5a-c illustrate an example of an electronic stylus sensitive device and stylus configured to perform stylus hover over actions, in accordance with an embodiment of the present invention. As seen in this example, a stylus sensitive display screen is displaying a selection of text. The text could be, for example, a page of an eBook, a word document, or any other selection of text. In the example shown in FIG. 5a, the user is viewing page 1 of the text at a size 12 font. In this particular example, pressing and holding the top button of the stylus is associated with increasing the font size of the displayed text (e.g., hard-coded or via a configuration sub-menu) and there is no content selection prior to performing the font increase function. Furthermore, in this example embodiment the press-and-release action of the top button is associated with turning the pages of the displayed text. As can be seen in reference to FIG. 5b, when the user presses and holds the top button of the stylus while hovering the stylus above the device the font size increases. In this particular example, the user holds down the button long enough to increase the font size to size 18 font. In another embodiment, the font increase function may be accompanied with a graphic box displaying to the user the font size as it increases. In another embodiment the font size (or other variable being adjusted) may be set to increase one font size per second, or at some other desired rate. In some embodiments the increase font size may be performed regardless of where the stylus is located above the stylus sensitive display. In other embodiments, however, a press-and-hold function above one area of the screen (the bottom right area, for example) may result in an increase in the font size while a press-and-hold function above another area of the screen (the bottom left, for example) may result in a decrease in the font size. As discussed above, such functions may be hard-coded or user-configurable.

In the example shown in FIG. 5c, the user has pressed and released the top button of the stylus while hovering the stylus over the stylus sensitive display, thus turning to page 2 of the text. In this particular example, the user has performed one button click, and therefore moved one page forward. In such an example, the next page action is performed upon release of the button and the stylus must remain sufficiently proximate to the stylus detection surface until the button is released. In such an example, if the user decides not to perform the next page action after pressing the button, the user may move the stylus away from the stylus sensitive display before releasing the button, and the action will effectively be canceled. In other embodiments, the next page action can commence immediately upon pressing of the stylus button and the stylus need only remain communicatively coupled with the device. In some embodiments the next page function may be performed regardless of where the stylus is located above the surface of the stylus sensitive display, while in other embodiments different functions may be assigned to control feature actions at different locations above the device. In one specific such example, the top button action may provide the next page to the user when it is performed hovering over the right edge of the file or eBook being viewed, while the same action performed over the left edge of the file or eBook may provide the previous page to the user.

Methodology

Figure 6:
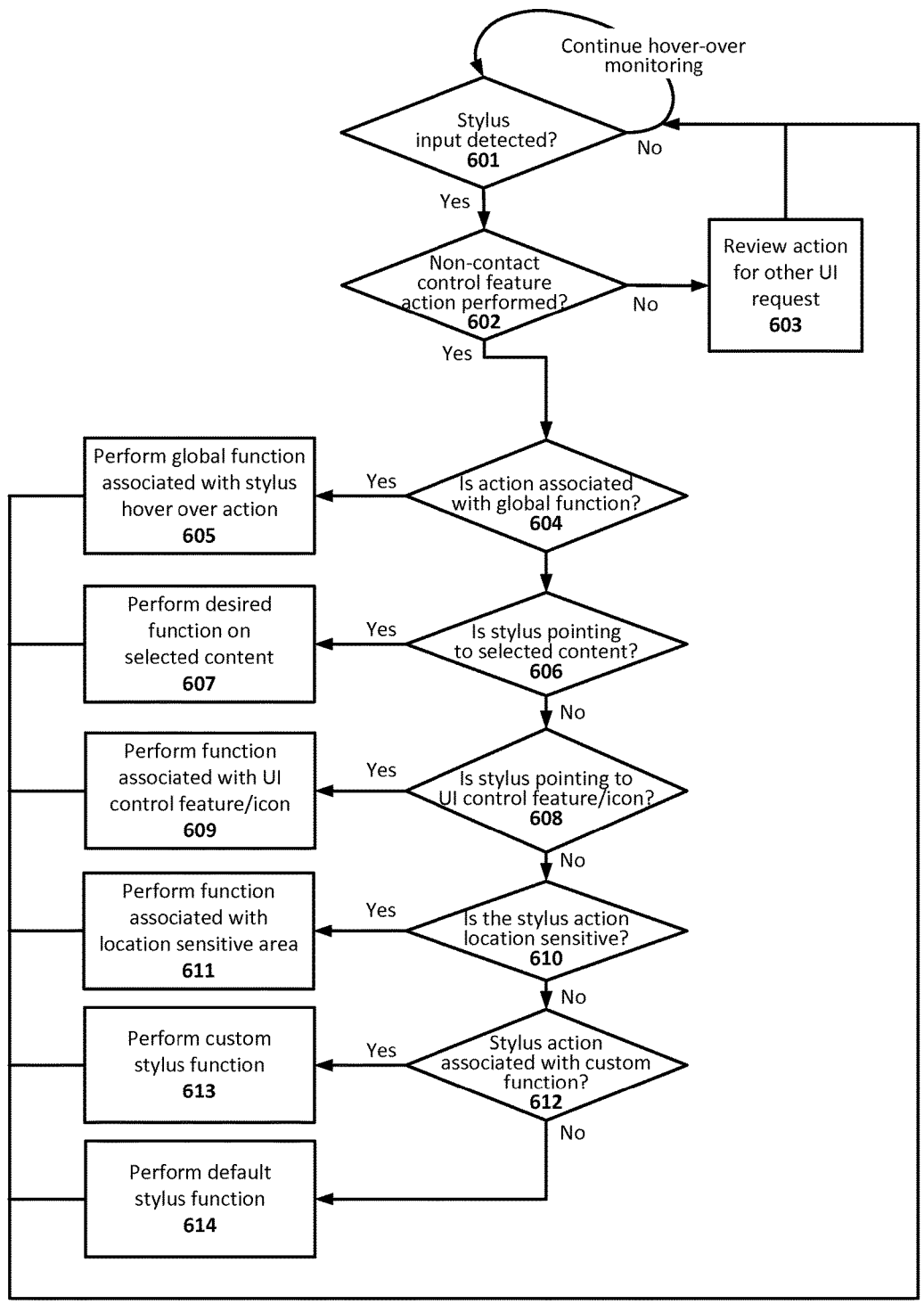
FIG. 6 illustrates a method for performing device functions using a stylus hover over action, in accordance with an embodiment of the present invention.

FIG. 6 illustrates a method for performing a stylus action while hovering the stylus above the surface of an electronic stylus sensitive device, in accordance with an embodiment of the present invention. This example methodology may be implemented, for instance, by the UI module of the electronic computing device shown in FIG. 2a. To this end, the UI module can be implemented in software, hardware, firmware, or any combination thereof, as will be appreciated in light of this disclosure. The various stylus hover over actions may be communicated to the device over a communication link (e.g., EMR link, and/or dedicated communication link such as NFC or Bluetooth).

In general, any stylus sensitive surface may be used to detect the stylus hovering over the device. As discussed above, EMR or other suitable technology may be implemented to detect the presence of a stylus hovering over a stylus sensitive display, as well as to communicate stylus actions to the electronic device. In one particular example, EMR technology may be implemented to power and/or track a stylus hovering over a stylus sensitive display. In one such example, a control feature action may be communicated from the stylus to the device by manipulating the resonant frequency of a resonant circuit within the stylus. This change in resonant frequency may be detected by the antenna coils of the stylus detection grid, thus triggering a response at the device, in accordance with some such embodiments. Various control features and/or control feature actions of the stylus may create different changes in resonant frequency, and thus may be assigned distinct functions. The stylus detection grid may track the location of the stylus, thus determining whether the stylus is pointing at selected content, a UI control feature or icon, a specific area of the stylus sensitive display, etc. These main detections can be used in various ways to implement UI functionality.

In this example case, the method includes monitoring 601 whether stylus input has been received, which may include input received when the stylus is hovering over or is otherwise sufficiently proximate to the stylus detection surface. In some embodiments, monitoring for stylus input includes monitoring all or part of a stylus sensitive display screen. In general, the stylus-based input monitoring is effectively continuous, and once a stylus input has been detected, the method may continue with determining 602 whether a non-contact stylus control feature action has been performed. Example such control feature actions may include a button click or press-and-release action, a press-and-hold action, a control knob/wheel action, a switch action, a combination of control feature actions, or any other stylus-based control action that doesn't involve the stylus directly contacting the touch sensitive surface of the related computing device. If no touch-free control feature action has been performed, the method may continue with reviewing 603 the stylus hover over action for other UI requests (such as touch-based stylus input). If a non-contact stylus control feature action has been performed, the method may continue with determining 604 whether the touch-free stylus input action is associated with a global function. If the touch-free stylus input action is associated with a global function, the method may continue with performing 605 the global function. If the stylus action is not associated with a global function, the method may continue with determining 606 whether the stylus is pointing to selected content on the electronic device. In some embodiments, the selected content may include, for example, a section of text, a selected file or application, or any other selected content displayed on the electronic device. Note that in some cases, the mere act of pointing the stylus at the target content effectively amounts to selecting that content, without anything further (e.g., no highlighting). If the stylus is pointing to selected content on the electronic device, the method may continue with performing 607 a desired function on the selected content. The desired function may be hard-coded or user-configurable and examples may include deleting the selected text or file, running the selected application, increasing font size, or any other action that may be performed on the selected content. If the stylus is not pointing at selected content on the electronic device, the method may continue with determining 608 whether the stylus is pointing to a UI control feature or UI icon. The UI control feature or icon may include, for example, a volume icon, a slide bar, a brightness indicator, a tap point graphic, etc. If the stylus is pointing to a UI control feature or icon, the method may continue with performing 609 a function associated with the UI control feature or icon. Functions associated with UI control features or icons, for example, may include scrolling down, increasing or decreasing volume, increasing or decreasing brightness, selecting a tap point graphic, etc. If the stylus is not pointing at a UI control feature or icon, the method may continue with determining 610 whether the stylus action is location sensitive. If the stylus action is location sensitive, then the method may continue with performing 611 a function associated with the location sensitive area of the electronic device. A location sensitive stylus action, for example, may include a stylus action hovering over the right side of a display which turns to the next page of an eBook application. Many other location sensitive stylus hover over actions will be apparent in light of this disclosure. If the stylus action is not location sensitive, the method may continue with determining 612 whether the stylus action is associated with a custom function. If the stylus action is associated with a custom function, the method may continue with performing 613 the custom function. If the stylus action is not associated with a custom function, the method may continue with performing 614 a default hover over stylus function. After any of the stylus functions has been performed, the method may continue with further monitoring 601 whether a stylus is hovering over a stylus detection surface.

Numerous variations and embodiments will be apparent in light of this disclosure. One example embodiment of the present invention provides a system including an electronic device having a display for displaying content to a user and a stylus detection surface for allowing user input via a stylus. The system also includes a user interface executable on the device and including a stylus hover over mode, wherein the stylus hover over mode is configured to perform a function on the device in response to a stylus-based control feature input provided without direct contact between the stylus detection surface and stylus. In some cases, the stylus hover over mode is further configured to perform a function on the stylus. In some cases, the stylus detection surface includes at least one set of antenna coils configured to detect changes in a resonant circuit within the stylus. In some cases, the stylus detection surface further includes a second set of antenna coils configured to detect at least one of location, speed of stylus movement, angle of stylus inclination and/or a change in resonant frequency of the resonant circuit within the stylus. In some cases, the system further includes a stylus, wherein the stylus includes at least one control feature including at least one of a button, a rotating knob, a switch, a touch-sensitive area, a pressure-sensitive area, and/or a sliding control switch, any of which can be used to provide the stylus-based control feature input. In some such embodiments, the stylus is configured to communicate with the electronic device over a wireless communication link. In some such cases, the stylus can be configured in real-time over the wireless communication link. In some cases, the stylus detection surface detects a stylus-based control feature input by detecting a change in resonant frequency of the stylus. In some cases, the stylus-based control feature input includes a combination of stylus-based control feature actions that is unique from other stylus-based control feature input. In some cases, the function performed by the stylus hover over mode is user-configurable. In some cases, the electronic device is further configured to provide at least one of an audio and/or visual notification associated with a function. In some cases, the function performed by the stylus hover over mode is determined based on stylus location over the stylus detection surface. In some cases, the display is a touch screen display and includes the stylus detection surface. In some cases, the electronic device is an eReader device or a tablet computer or a smartphone. In some cases, the stylus-based control feature input is derived from at least one of a press-and-release action and/or a press-and-hold action.

Another example embodiment of the present invention provides a system including an electronic device having a display for displaying content to a user and a stylus detection surface for allowing user input. The system also includes a stylus having at least one control feature, wherein the stylus is configured to communicate with the electronic device via the stylus detection surface. The system also includes a user interface executable on the device and comprising a stylus hover over mode, wherein the stylus hover over mode is configured to perform a function on the device in response to a stylus-based control feature input provided without the stylus directly touching the stylus detection surface.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to display content to a user via a device having a stylus detection surface for allowing user input via a stylus; and perform a function in response to a stylus-based control feature input provided without direct contact between the stylus detection surface and stylus. In some cases, the function includes at least one of performing an undo action, performing an redo action, launching a note taking application, recording a sound and/or images, or switching from a first tool to a second tool. In some cases, the stylus control feature input is provided by a stylus-based control feature comprising at least one of a button, a rotating knob, a switch, and/or a sliding control switch of the stylus. In some cases, the stylus detection surface detects a stylus-based control feature input by detecting a change in resonant frequency of the stylus.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for performing a function in response to receiving input from a stylus that includes an elongated body portion, a tip on an end of the elongated body portion, and a control feature on the elongated body portion, the system comprising:
 an electronic device having a display for displaying content to a user and a stylus detection surface for allowing user input via the stylus tip; and
 a user interface executable on the electronic device and comprising a stylus hover over mode, wherein the stylus hover over mode is configured to perform a function on the electronic device in response to input provided via the stylus-based control feature, the stylus-based control feature input provided without direct contact between the stylus detection surface and the stylus, and wherein the stylus-based control feature input is provided from at least one of a button on the stylus, a rotating knob on the stylus, a switch on the stylus, a touch-sensitive area on the stylus, a pressure-sensitive area on the stylus, and a sliding control switch on the stylus;
 wherein the function performed on the electronic device is determined based on both a predetermined stylus location over the stylus detection surface and content presented on the display, such that the function is performed in response to the stylus-based control feature input being provided while the stylus is hovering over the stylus detection surface.

2. The system of claim 1 wherein when the stylus is located over a user interface control feature or icon associated with an operating parameter of the electronic device, the function performed on the electronic device in response to the stylus-based control feature input includes changing the operating parameter.

3. The system of claim 1 wherein the stylus detection surface comprises at least one set of antenna coils configured to detect changes in a resonant circuit within the stylus.

4. The system of claim 3 wherein the stylus detection surface further comprises a second set of antenna coils configured to detect at least one of location, speed of stylus movement, angle of stylus inclination and a change in resonant frequency of the resonant circuit within the stylus.

5. The system of claim 1 further comprising the stylus.

6. The system of claim 5 wherein, in addition to being configured to communicate stylus-based control feature inputs to the electronic device via the stylus detection surface, the stylus is further configured to communicate with the electronic device over a wireless communication link.

7. The system of claim 6 wherein the stylus can be configured in real-time over the wireless communication link.

8. The system of claim 1 wherein at least two different inputs are available for selection using the stylus-based control feature.

9. The system of claim 1 wherein the function performed is based on the duration of the stylus-based control feature input.

10. The system of claim 1 wherein the function performed on the electronic device is user-configurable.

11. The system of claim 1 wherein the electronic device is further configured to provide at least one of an audio and visual notification associated with the function performed on the electronic device.

12. The system of claim 1 wherein the function performed on the electronic device includes at least one of performing an undo action, performing a redo action, launching a note taking application, recording a sound, recording an image, recording a video, adjusting a variable parameter of the electronic device, and switching from a first tool to a second tool.

13. The system of claim 1 wherein the display is a touch screen display and includes the stylus detection surface.

14. The system of claim 1 wherein the electronic device is an eReader device or a tablet computer or a smartphone.

15. The system of claim 1 wherein the stylus-based control feature input is derived from at least one of a press-and-release action on the stylus and a press-and-hold action on the stylus.

16. A system for performing a function in response to receiving input from a stylus that includes an elongated body portion, a tip on an end of the elongated body portion, and a control feature on the elongated body portion, the system comprising:
 an electronic device having a display for displaying content to a user and a stylus detection surface for allowing user input via the stylus tip; and
 a user interface executable on the electronic device and comprising a stylus hover over mode, wherein the stylus hover over mode is configured to perform a function on the electronic device in response to a stylus-based control feature input provided without the stylus directly touching the stylus detection surface, and wherein the stylus-based control feature input is provided from at least one of a button on the stylus, a rotating knob on the stylus, a switch on the stylus, a touch-sensitive area on the stylus, a pressure-sensitive area on the stylus, and a sliding control switch on the stylus;
 wherein the function performed on the electronic device is determined based on both a predetermined stylus location over the stylus detection surface and content presented on the display, such that the function is performed in response to the stylus-based control feature input being provided while the stylus is hovering over the stylus detection surface; and
 wherein the function includes changing a given operating parameter of the electronic device.

17. A non-transitory computer program product encoded with instructions that when executed by one or more processors cause a process to be carried out, the process comprising:
 display content to a user via an electronic device configured to receive input via a stylus that includes an elongated body portion, a tip on an end of the elongated body portion, and a pressure-sensitive control feature on the elongated body portion, the electronic device having a stylus detection surface for allowing user input via the stylus tip; and
 perform a function on the electronic device in response to input provided via the stylus-based control feature, the stylus-based control feature input provided without direct contact between the stylus detection surface and the stylus, wherein the stylus-based control feature input is provided from at least one of a button on the stylus, a rotating knob on the stylus, a switch on the stylus, a touch-sensitive area on the stylus, a pressure-sensitive area on the stylus, and a sliding control switch on the stylus;

wherein the function performed on the electronic device is determined based on both a predetermined stylus location over the stylus detection surface and content presented on the display, such that the function is performed in response to the stylus-based control feature input being provided while the stylus is hovering over the stylus detection surface.

18. The non-transitory computer program product of claim 17 wherein the function performed on the electronic device includes at least one of performing an undo action, performing a redo action, launching a note taking application, recording a sound, recording an image, recording a video, adjusting a variable parameter of the electronic device, and switching from a first tool to a second tool.

19. The non-transitory computer program product of claim 17 wherein at least two different inputs are available for selection using the stylus-based control feature.

20. The non-transitory computer program product of claim 17 wherein the stylus detection surface detects a stylus-based control feature input by detecting a change in resonant frequency of the stylus.

21. A non-transitory-computer program product encoded with instructions that when executed by one or more processors cause a process to be carried out, the process comprising:

display content to a user via an electronic device configured to receive input via a stylus that includes an elongated body portion, a tip on an end of the elongated body portion, and a pressure-sensitive control feature on the elongated body portion, the electronic device having a stylus detection surface for allowing user input via the stylus tip; and perform a function on the electronic device in response to input provided via the stylus-based control feature, the stylus-based control feature input provided without direct contact between the stylus detection surface and the stylus, wherein the stylus-based control feature input is provided from at least one of a button on the stylus, a rotating knob on the stylus, a switch on the stylus, a touch-sensitive area on the stylus, a pressure-sensitive area on the stylus, and a sliding control switch on the stylus;

wherein the function performed on the electronic device is determined based on both a predetermined stylus location over the stylus detection surface and content presented on the display, such that the function is performed in response to the stylus-based control feature input being provided while the stylus is hovering over the stylus detection surface; and wherein the function includes changing a given operating parameter of the electronic device.

\* \* \* \* \*